(12) United States Patent
Liu

(10) Patent No.: US 11,291,019 B2
(45) Date of Patent: Mar. 29, 2022

(54) METHOD OF HANDLING CHANNEL ALLOCATION FOR MULTIPLE NETWORK NODES

(71) Applicant: Moxa Inc., New Taipei (TW)

(72) Inventor: Hsiang-Fu Liu, New Taipei (TW)

(73) Assignee: Moxa Inc., New Taipei (TW)

(*) Notice: Subject to any disclaimer, the term of this patent is extended or adjusted under 35 U.S.C. 154(b) by 85 days.

(21) Appl. No.: 17/001,686

(22) Filed: Aug. 25, 2020

(65) Prior Publication Data

US 2022/0070877 A1 Mar. 3, 2022

(51) Int. Cl.
*H04W 72/10* (2009.01)
*H04W 72/04* (2009.01)

(52) U.S. Cl.
CPC ....... *H04W 72/10* (2013.01); *H04W 72/0493* (2013.01)

(58) Field of Classification Search
CPC .......................... H04W 72/10; H04W 72/0493
See application file for complete search history.

(56) References Cited

U.S. PATENT DOCUMENTS

| | | | |
|---|---|---|---|
| 2008/0159208 A1 | 7/2008 | Kloker | |
| 2010/0284360 A1* | 11/2010 | Dalsgaard | H04W 24/10 370/329 |
| 2017/0311336 A1 | 10/2017 | Bane | |
| 2018/0176938 A1* | 6/2018 | Shao | H04W 52/346 |
| 2018/0338335 A1* | 11/2018 | Mukherjee | H04L 27/0006 |
| 2019/0124665 A1 | 4/2019 | Singh | |
| 2021/0289513 A1* | 9/2021 | Hafeez | H04W 16/14 |

FOREIGN PATENT DOCUMENTS

| | | |
|---|---|---|
| JP | 2006-54849 A | 2/2006 |
| JP | 2008-67121 A | 3/2008 |
| JP | 2008-289056 A | 11/2008 |
| JP | 2010-171893 A | 8/2010 |
| JP | 2010-206577 A | 9/2010 |
| WO | 2016/120360 A1 | 8/2016 |

* cited by examiner

*Primary Examiner* — Kashif Siddiqui
(74) *Attorney, Agent, or Firm* — Winston Hsu

(57) ABSTRACT

A method for a network to handle channel allocation for multiple network nodes comprises obtaining at least one first channel of a first network node and at least one second channel of a second network node; determining that a first priority of the first network node is lower than a second priority of the second network node according to at least one policy; selecting at least one first available channel from the at least one first channel according to at least one second allocated channel of the second network node, after selecting the at least one second allocated channel; selecting at least one first allocated channel from the at least one first available channel, if the network selects the at least one first available channel from the at least one first channel successfully; and allocating the at least one first allocated channel to the first network node.

20 Claims, 8 Drawing Sheets

METHOD OF HANDLING CHANNEL ALLOCATION FOR MULTIPLE NETWORK NODES

BACKGROUND OF THE INVENTION

1. Field of the Invention

The present invention relates to a method used in a wireless communication system, and more particularly, to a method of handling channel allocation for multiple network nodes.

2. Description of the Prior Art

A large amount of network nodes are deployed along railway tracks in a rail transportation system to serve communications between vehicles (e.g., trains, Mass Rapid Transit (MRT) trains) and the rail transportation system. The network nodes operate in the same or different channels. Characteristics of the channels between the network nodes and the vehicles vary with time, locations of the vehicles and locations of the network nodes. It is difficult to allocate the channels to achieve a satisfied performance considering the characteristics of the channels. Thus, the allocation of the channels for the network nodes is an important problem to be solved.

SUMMARY OF THE INVENTION

The present invention therefore provides a method and related network for handling channel allocation for multiple network nodes to solve the abovementioned problem.

A method for a network to handle channel allocation for multiple network nodes, comprises obtaining at least one first channel of a first network node and at least one second channel of a second network node; determining that a first priority of the first network node is lower than a second priority of the second network node according to at least one policy; selecting at least one first available channel from the at least one first channel according to at least one second allocated channel of the second network node, after selecting the at least one second allocated channel; selecting at least one first allocated channel from the at least one first available channel, if the network selects the at least one first available channel from the at least one first channel successfully; and allocating the at least one first allocated channel to the first network node.

At least one processor configured to handle channel allocation for multiple network nodes comprises a first module for causing the at least one processor to obtain at least one first channel of a first network node and at least one second channel of a second network node; a second module for causing the at least one processor to determine that a first priority of the first network node is lower than a second priority of the second network node according to at least one policy; a third module for causing the at least one processor to select at least one first available channel from the at least one first channel according to at least one second allocated channel of the second network node, after selecting the at least one second allocated channel; a fourth module for causing the at least one processor to select at least one first allocated channel from the at least one first available channel, if the at least one first available channel is selected from the at least one first channel successfully; and a fifth module for causing the at least one processor to allocate the at least one first allocated channel to the first network node.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
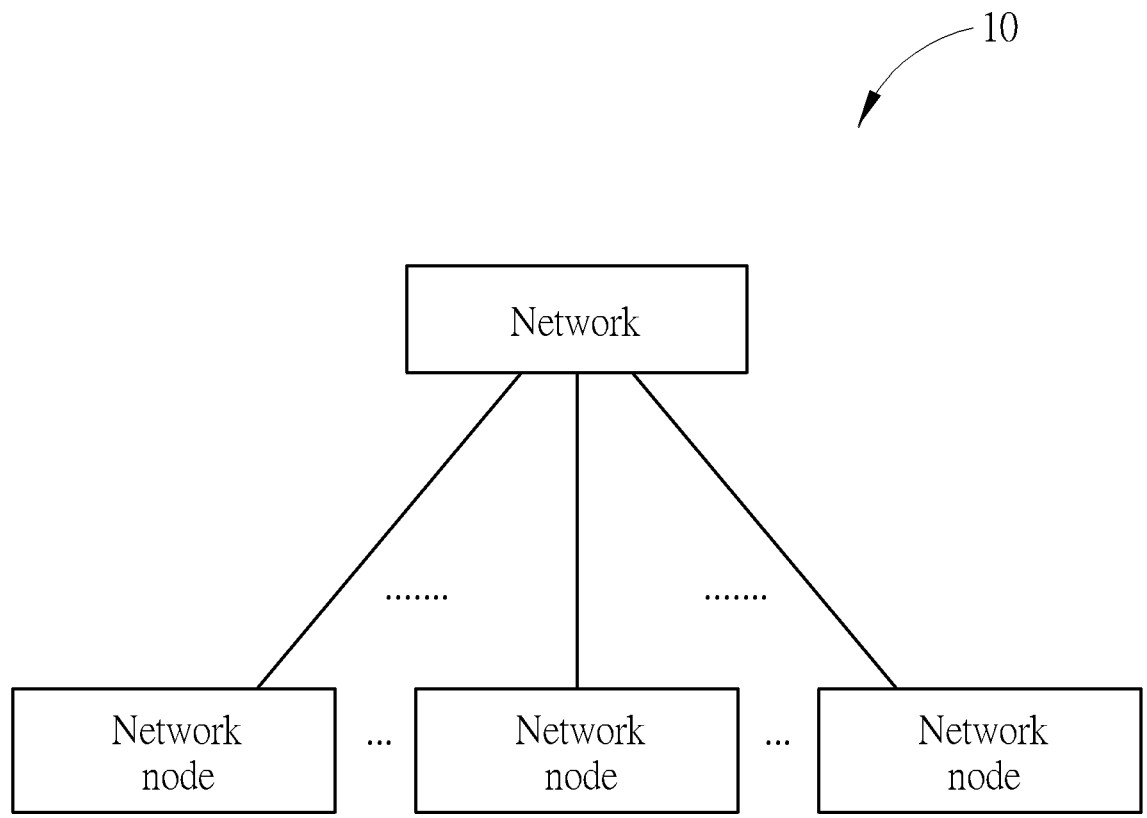
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of network nodes. The network may comprise a network entity for controlling the plurality of network nodes. In one example, the wireless communication system 10 may be a cellular network system or a wireless local area network (WLAN) system, such as a system conforming to IEEE 802.11 standard(s).

In FIG. 1, the network and the plurality of network nodes are simply utilized for illustrating the structure of the wireless communication system 10. In one example, the plurality of network nodes may form a wireless mesh network. That is, the plurality of network nodes may connect to each other, and may operate in the same channel. In one example, the network may be a universal terrestrial radio access network (UTRAN) including at least one Node-B (NB) in a universal mobile telecommunications system (UMTS). In one example, the network may be an evolved UTRAN (E-UTRAN) including at least one evolved NB (eNB) and/or at least one relay node in a long term evolution (LTE) system, a LTE-Advanced (LTE-A) system, an evolution of the LTE-A system, etc. In one example, the network may be a next generation radio access network (NG-RAN) including at least one next generation Node-B (gNB) and/or at least one fifth generation (5G) base station (BS). It should be noted that a network node may be a cell, a BS, a WLAN access point (AP), etc.

In one example, the wireless communication system 10 may be operated for a rail transportation system including multiple stations and vehicles, e.g., Mass Rapid Transit (MRT) trains. That is, the stations may be configured with network nodes to communicate with the vehicles.

Figure 2:
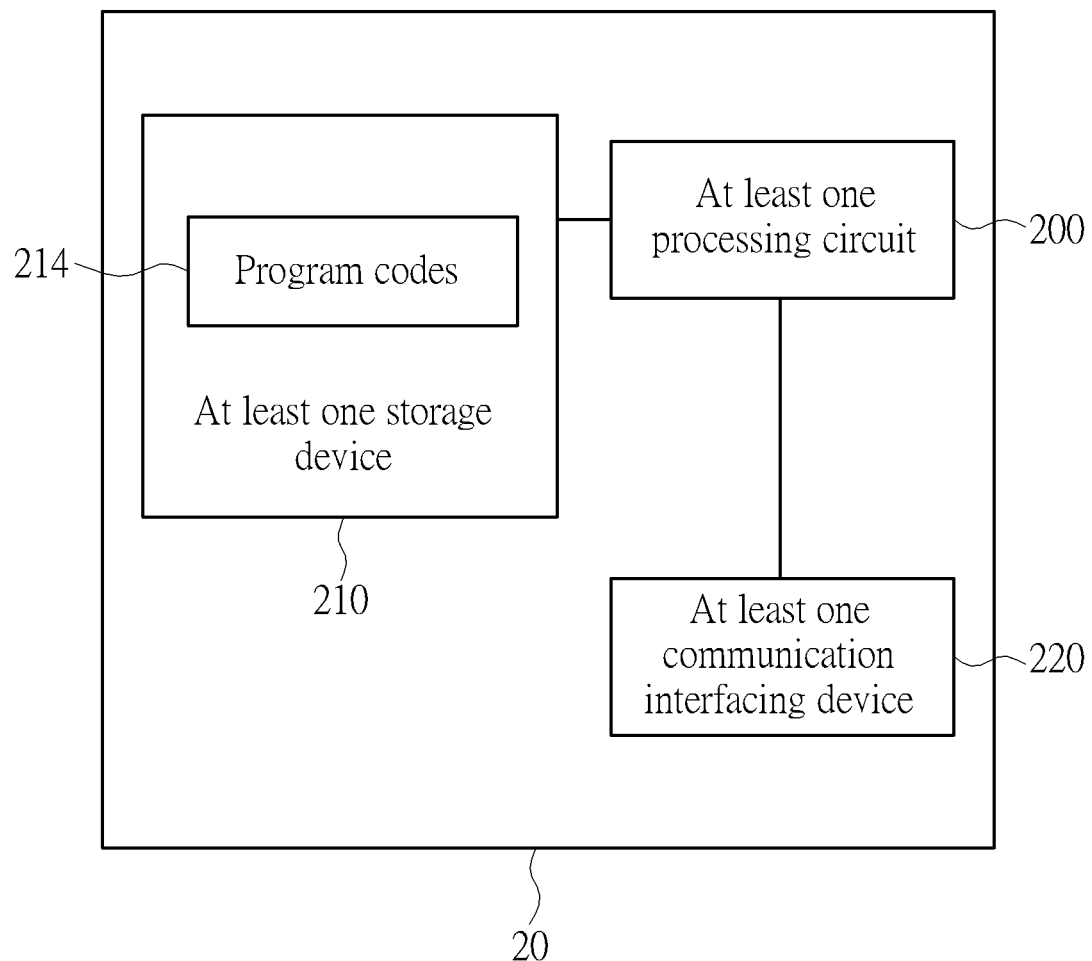
FIG. 2 is a schematic diagram of a communication device according to an example of the present invention.

FIG. 2 is a schematic diagram of a communication device 20 according to an example of the present invention. The communication device 20 may be the network or any of the network node(s) shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

Figure 3:
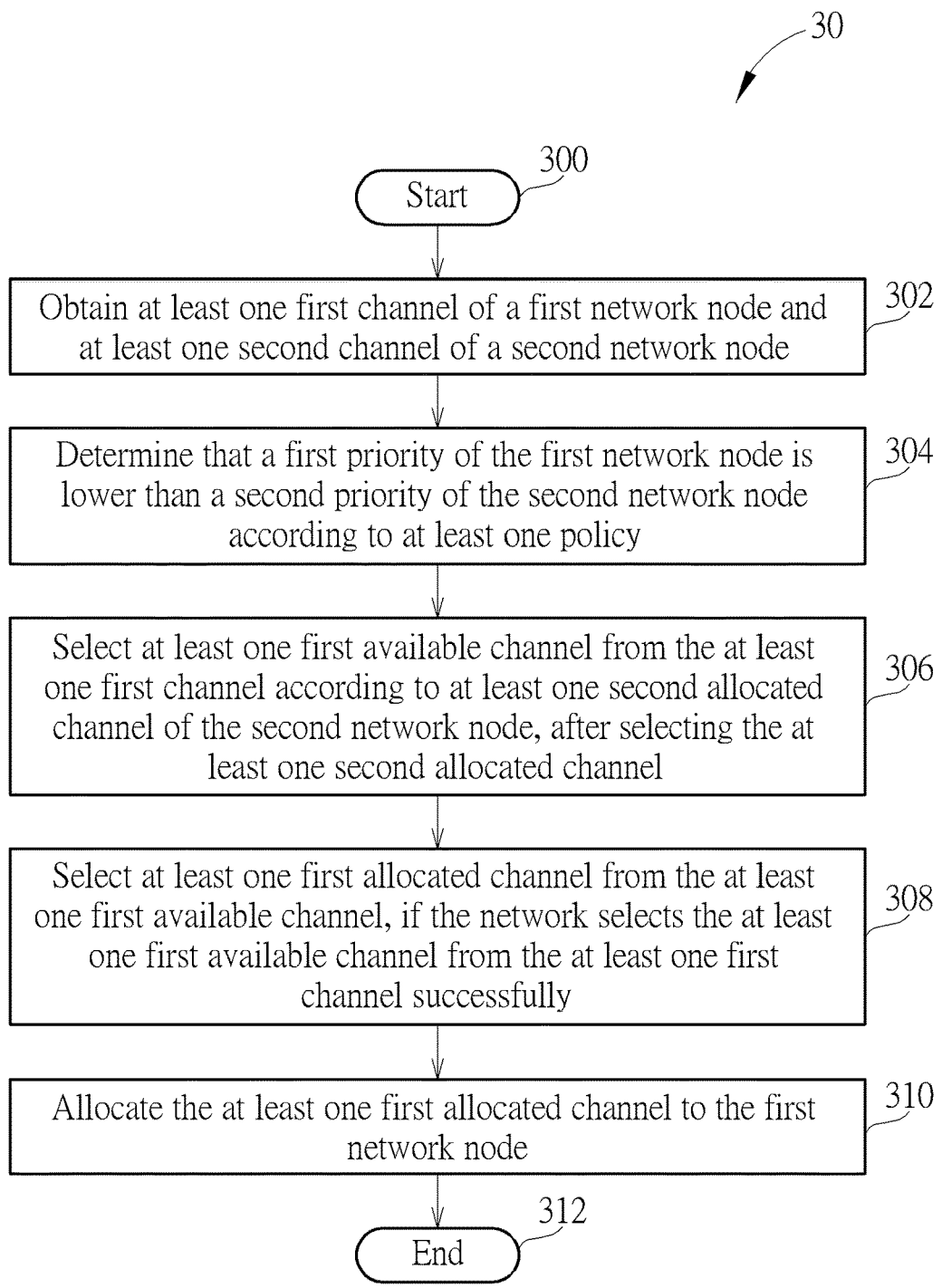
FIG. 3 is a flowchart of a process according to an example of the present invention.

FIG. 3 is a flowchart of a process 30 according to an example of the present invention. The process 30 may be utilized in a network, to handle channel allocation for multiple network nodes. The process 30 may be compiled into the program codes 214 and includes the following steps:

Step 300: Start.

Step 302: Obtain at least one first channel of a first network node and at least one second channel of a second network node.

Step 304: Determine that a first priority of the first network node is lower than a second priority of the second network node according to at least one policy.

Step 306: Select at least one first available channel from the at least one first channel according to at least one second allocated channel of the second network node, after selecting the at least one second allocated channel.

Step 308: Select at least one first allocated channel from the at least one first available channel, if the network selects the at least one first available channel from the at least one first channel successfully.

Step 310: Allocate the at least one first allocated channel to the first network node.

Step 312: End.

According to the process 30, the network (e.g., a network entity, a central server) obtains (e.g., determines, derives) at least one first (candidate) channel of a first network node (e.g., an AP, a cell) and at least one second (candidate) channel of a second network node (e.g., an AP, a cell). The network determines that a first priority of the first network node is lower than a second priority of the second network node according to (e.g., based on) at least one (priority) policy. The network selects at least one first available channel from the at least one first channel according to at least one second allocated channel of the second network node, after selecting the at least one second allocated channel. The network selects at least one first allocated channel from the at least one first available channel, if (e.g., after) the network selects the at least one first available channel from the at least one first channel successfully. Then, the network allocates the at least one first allocated channel to the first network node. That is, the allocated channel(s) of the network node with the lower priority is selected, after the allocated channel(s) of the network node with the higher priority is selected. In other words, the allocated channels of the network nodes are selected in a descending order of the priorities of the network nodes. Thus, the problem of channel selection and allocation/reallocation for multiple network nodes is solved.

Realization of the process 30 is not limited to the above description. The following examples may be applied for realizing the process 30.

In one example, the network selects the at least one first available channel, after the first network node is switched on (e.g., powered on). In one example, the network selects the at least one first available channel, after receiving a message requesting for a channel allocation/reallocation from the first network node. In one example, the network selects the at least one first available channel, after determining to perform a channel allocation/reallocation (e.g., to change a current allocated channel) for the first network node according to certain condition(s). For example, the condition(s) comprises determining whether interference caused to the network nodes forms a complete graph, i.e., whether each pair of the network nodes is interfered by each other. In detail, when one of the network nodes in the complete graph requests for a channel allocation/reallocation, there may not be any channel left for the one of the network nodes to switch to. Under the situation that updating the one of the network nodes is regarded as critical (e.g., by the network), the network may also determine (or may be triggered) to perform channel allocations for the rest of the network nodes in the complete graph. That is, the updating scope is expanded from one network node to all the network nodes in the complete graph. In contrast, under the situation that updating the one of the network nodes is regarded as uncritical (e.g., by the network), the network may simply report a failure without updating the rest of the network nodes in the complete graph.

In one example, the at least one first channel and the at least one second channel are indicated (e.g., updated) by the first network node and the second network node, respectively. In one example, the at least one first channel and the at least one second channel are stored in a table or in a database (e.g., by the network). In one example, the first network node is interfered by the second network node. In other words, a distance between the first network node and the second network node is smaller than an interference distance of the second network node. For example, a signal of the second network node may leak to (e.g., be detected in) a communication coverage area of the first network node. In one example, the first network node is interfered by the second network node, if the first network nodes and the second network node operate in a channel and a distance between the first network node and the second network node is smaller than a reuse distance of the channel. That is, co-channel interference occurs between the two network nodes. In this situation, an interference distance of the second network node operating in the channel is equal to the reuse distance of the channel.

In one example, the at least one policy comprises high-interference-first, low-(candidate) channel-first, large-transmission-amount-first, maximize-throughput-first, maximize-network-length-first or combination thereof. In one example, the at least one policy is determined (e.g., configured) by the network. In one example, the instruction of determining that the first priority is lower than the second priority according to the policy includes determining that the first priority is lower than the second priority, if (e.g., when) first interference caused to the first network node is smaller than second interference caused to the second network node. In one example, the first interference and the second interference are measured and reported by the first network node and the second network node, respectively. In one example, the network obtains (measures) the first interference and the second interference.

In one example, the instruction of determining that the first priority is lower than the second priority according to the policy includes determining that the first priority is lower than the second priority, if (e.g., when) a first transmission amount of the first network node is smaller than a second transmission amount of the second network node. In one example, the instruction of determining that the first priority is lower than the second priority according to the policy includes determining that the first priority is lower than the second priority, if (e.g., when) a first number of the at least one first channel is greater than a second number of the at least one second channel.

In one example, the at least one first channel and the at least one second channel do not comprise at least one current allocated channel of any network node(s) (e.g., the first network node, the second network node). In other words, the at least one current allocated channel is not a candidate channel of any network node(s) (e.g., the first network node, the second network node). In one example, the network clears (e.g., deallocates, releases) at least one current allocated channel of the first network node, before obtaining the at least one first channel and the at least one second channel. In one example, the network clears (e.g., deallocates, releases) at least one current allocated channel of the second network node, before obtaining the at least one first channel and the at least one second channel. That is, current allocated channel(s) of the network nodes are cleared before selecting (new) allocated channel (s) of the network nodes.

In one example, the network selects at least one second available channel from the at least one second channel, before selecting the at least one second allocated channel. In one example, the network selects all of the at least one second channel as the at least one second available channel, if the second priority is (determined as) highest in priorities of the network nodes. In one example, the network selects the at least one second allocated channel from the at least one second available channel. In one example, the network selects all of the at least one second available channel as the at least one second allocated channel.

In one example, the network allocates the at least one second allocated channel to the second network node, before selecting the at least one first available channel. In one example, the network allocates the at least one second allocated channel to the second network node, when allocating the at least one first allocated channel to the first network node.

In one example, the instruction of selecting the at least one first available channel from the at least one first channel according to the at least one second allocated channel includes selecting the at least one first channel which is not the at least one second allocated channel. That is, a channel allocated to the network node with a higher priority is determined as not available to the network node with a lower priority. In one example, the instruction of selecting the at least one first available channel from the at least one first channel according to the at least one second allocated channel includes selecting the at least one first channel which is not the at least one second allocated channel, if the first network node is interfered by the second network node. In one example, the instruction of selecting the at least one first available channel from the at least one first channel according to the at least one second allocated channel includes selecting the at least one first channel which is not the at least one second allocated channel, if each of at least one reuse distance of the at least one second allocated channel is greater than a distance between the first network node and the second network node.

In one example, the instruction of selecting the at least one first available channel from the at least one first channel according to the at least one second allocated channel includes selecting all of the at least one first channel, if the all of the at least one first channel are not the at least one second allocated channel. That is, the all of the at least one first channel are available to the first network node, if the all of the at least one first channel are not overlapped with the at least one second allocated channel. In one example, the instruction of selecting the at least one first available channel from the at least one first channel according to the at least one second allocated channel includes selecting all of the at least one first channel, if the first network node and the second network node are not interfered by each other. In one example, the instruction of selecting the at least one first available channel from the at least one first channel according to the at least one second allocated channel includes selecting all of the at least one first channel, if each of at least one reuse distance of the at least one second allocated channel is smaller than a distance between the first network node and the second network node. In one example, the network selects the at least one first available channel from the at least one first channel successfully, if at least one of the at least one first channel is not the at least one second allocated channel. That is, the at least one first available channel is not empty, if the at least one first channel is partially overlapped or not overlapped with the at least one second allocated channel.

In one example, the network fails to select the at least one first available channel from the at least one first channel, if all of the at least one first channel are the at least one second allocated channel. That is, none of the at least one first channel is available to the first network node, if the all of the at least one first channel are allocated to network node(s) with higher priorit(ies) (e.g., the second network node). In one example, the network reports to the first network node that there is not any available channel via a configuration, if the network fails to select the at least one first available channel from the at least one first channel. In one example, the network logs and escalates an incident that there is not any available channel, if the network fails to select the at least one first available channel. In one example, the network stops or revokes a channel allocation for the first network node, if the network fails to select the at least one first available channel.

In one example, at least one priority of the at least one first allocated channel is higher than at least one priority of the rest of the at least one first available channel. In one example, the at least one first allocated channel has better channel quality. The channel quality is measured in terms of signal-to-noise ratio (SNR). In one example, interference caused to the at least one first allocated channel is lower than interference caused to the rest of the at least one first available channel, or is lower than a threshold value. In one example, the at least one first allocated channel is not allocated to network node (s) with higher priorit(ies) (e.g., the second network node).

In one example, the network selects all of the at least one first available channel as the at least one first allocated channel. That is, the all of the at least one first available channel is allocated to the first network node.

Figure 4:
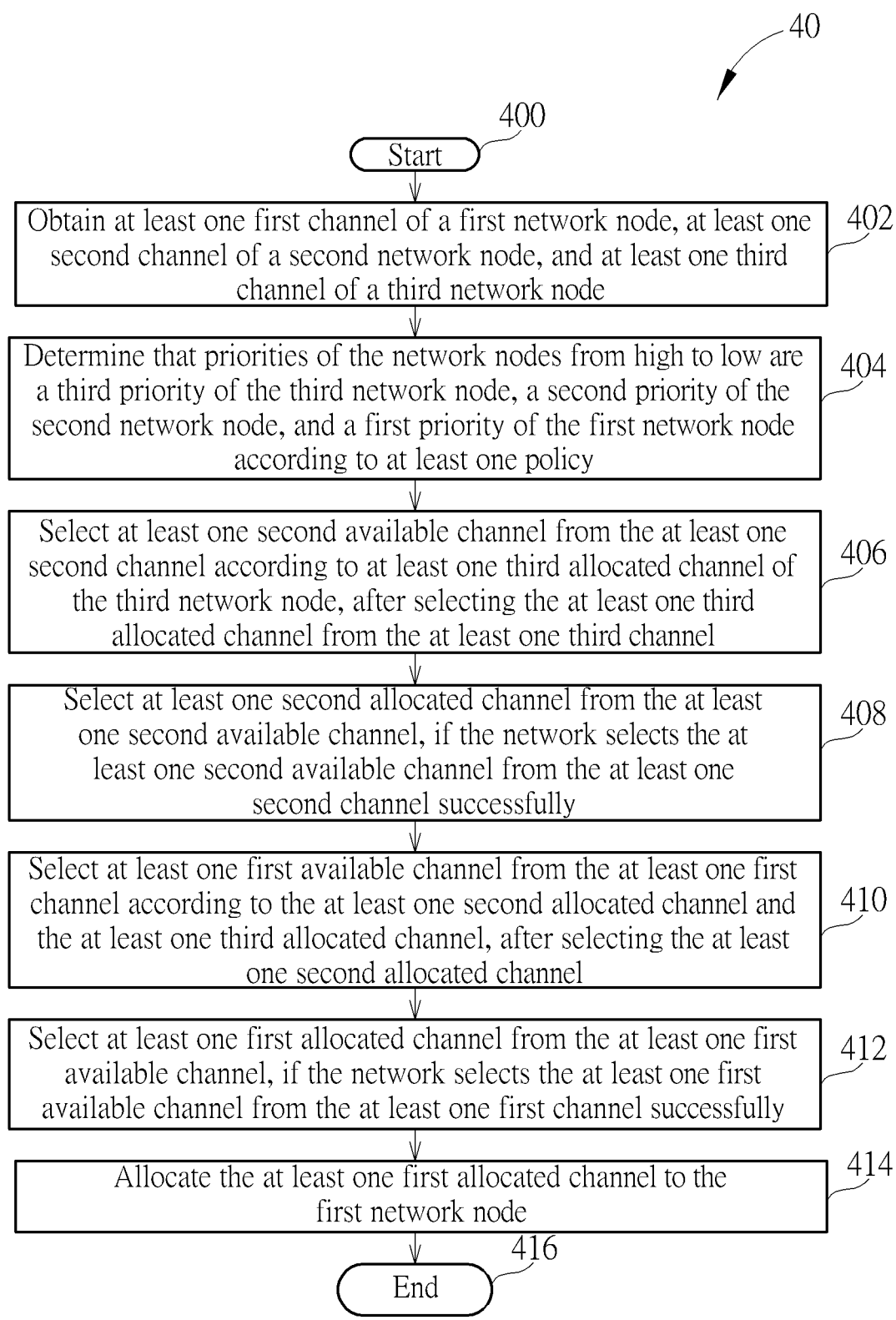
FIG. 4 is a flowchart of a process according to an example of the present invention.

FIG. 4 is a flowchart of a process 40 according to an example of the present invention. The process 40 may be utilized in a network, to handle channel allocation for multiple network nodes. The process 40 may be compiled into the program codes 214 and includes the following steps:

Step 400: Start.

Step 402: Obtain at least one first channel of a first network node, at least one second channel of a second network node, and at least one third channel of a third network node.

Step 404: Determine that priorities of the network nodes from high to low are a third priority of the third network node, a second priority of the second network node, and a first priority of the first network node according to at least one policy.

Step 406: Select at least one second available channel from the at least one second channel according to at least one third allocated channel of the third network node, after selecting the at least one third allocated channel from the at least one third channel.

Step 408: Select at least one second allocated channel from the at least one second available channel, if the network selects the at least one second available channel from the at least one second channel successfully.

Step 410: Select at least one first available channel from the at least one first channel according to the at least one second allocated channel and the at least one third allocated channel, after selecting the at least one second allocated channel.

Step 412: Select at least one first allocated channel from the at least one first available channel, if the network selects the at least one first available channel from the at least one first channel successfully.

Step 414: Allocate the at least one first allocated channel to the first network node.

Step 416: End.

According to the process 40, the network (e.g., a network entity, a central server) obtains (e.g., determines, derives) at least one first (candidate) channel of a first network node (e.g., an AP, a cell), at least one second (candidate) channel of a second network node (e.g., an AP, a cell), and at least one third (candidate) channel of a third network node (e.g., an AP, a cell). The network determines that priorities of the network nodes from high to low are a third priority of the third network node, a second priority of the second network node, and a first priority of the first network node according to (e.g., based on) at least one (priority) policy. The network selects at least one second available channel from the at least one second channel according to at least one third allocated channel of the third network node, after selecting the at least one third allocated channel from the at least one third channel. The network selects at least one second allocated channel from the at least one second available channel, if (e.g., after) the network selects the at least one second available channel from the at least one second channel successfully. The network selects at least one first available channel from the at least one first channel according to the at least one second allocated channel and the at least one third allocated channel, after selecting the at least one second allocated channel. The network selects at least one first allocated channel from the at least one first available channel, if (e.g., after) the network selects the at least one first available channel from the at least one first channel successfully. Then, the network allocates the at least one first allocated channel to the first network node. That is, the allocated channel(s) of the network node with the lower priority is selected, after the allocated channel(s) of the network node with the higher priority is selected. In other words, the allocated channels of the network nodes are selected in a descending order of the priorities of the network nodes. Thus, the problem of channel selection and allocation/reallocation for multiple network nodes is solved.

Realization of the process 40 is not limited to the above description. The description and the examples for the process 30 may be applied to the process 40, and are not repeated herein.

Figure 5:
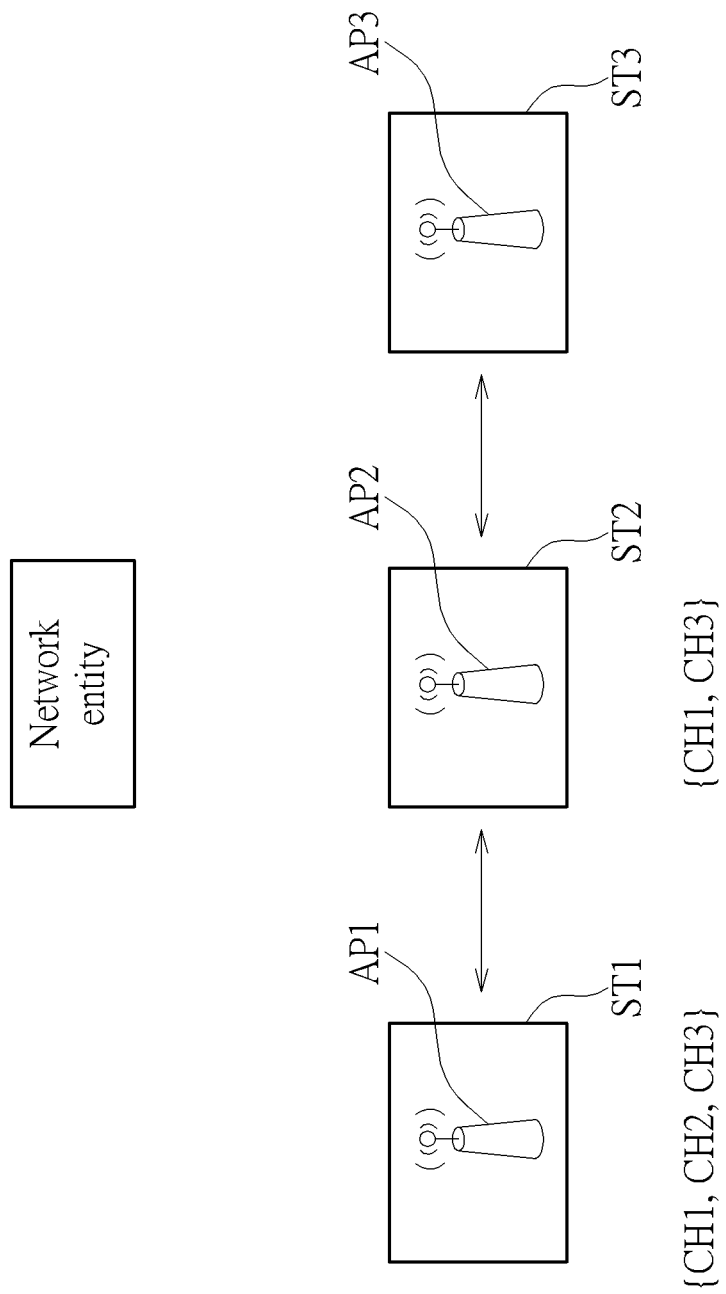
FIG. 5 is a schematic diagram of channel selection and allocation according to an example of the present invention.

FIG. 5 is a schematic diagram of channel selection and allocation according to an example of the present invention. As shown in FIG. 5, a rail transportation system includes a network entity (e.g., central server) and 3 APs AP1-AP3. The APs AP1-AP3 are deployed at 3 stations ST1-ST3, respectively. The network entity and the APs AP1-AP3 are used for representing a network and network nodes to simplify the illustration of the above examples. The network entity connects (not shown in FIG. 5) to the APs AP1-AP3, and handles resource (e.g., channel) allocations for the APs AP1-AP3. A double headed arrow between the APs represents respective interference between the APs. That is, the APs AP1-AP2 are interfered with each other, but the APs AP1, AP3 are not interfered with each other.

The APs AP1-AP2 may request for changing channels (e.g., current allocated channels). The APs AP1-AP2 may update candidate channels of the APs AP1-AP2 periodically, respectively. The candidate channels are stored in a table by the network entity. The network entity obtains from the table that the candidate channels of the AP AP1 are channels CH1-CH3, and the candidate channels of the AP AP2 are the channels CH1, CH3. In the present example, the AP AP2 has a higher priority, and the AP AP1 has a lower priority.

The network entity selects the channels CH1, CH3 from the candidate channels of the AP AP2, since the channels CH1, CH3 are available to the AP AP2. In one example, the channel CH3 has a better channel quality, or is affected by less interference. Thus, the network entity allocates the channel CH3 to the AP AP2.

The network entity starts to select available channel(s) of the AP AP1 from the candidate channels of the AP AP1, after selecting the channel CH3 allocated to the AP AP2. Since the channel CH3 is the allocated channel of the AP AP2 and is not available to the AP AP1, the network entity selects the channels CH1-CH2 for the AP AP1. In one example, the channel CH2 has a better channel quality, or is affected by less interference. Thus, the network entity allocates the channel CH2 to the AP AP1.

As can be seen, the network entity selects the allocated channels of the APs AP1-AP2 in a descending order of the priorities of the APs AP1-AP2. Thus, the APs AP1-AP2 can communicate with vehicle(s) (e.g., trains) (not shown in FIG. 5) with a better performance.

Figure 6:
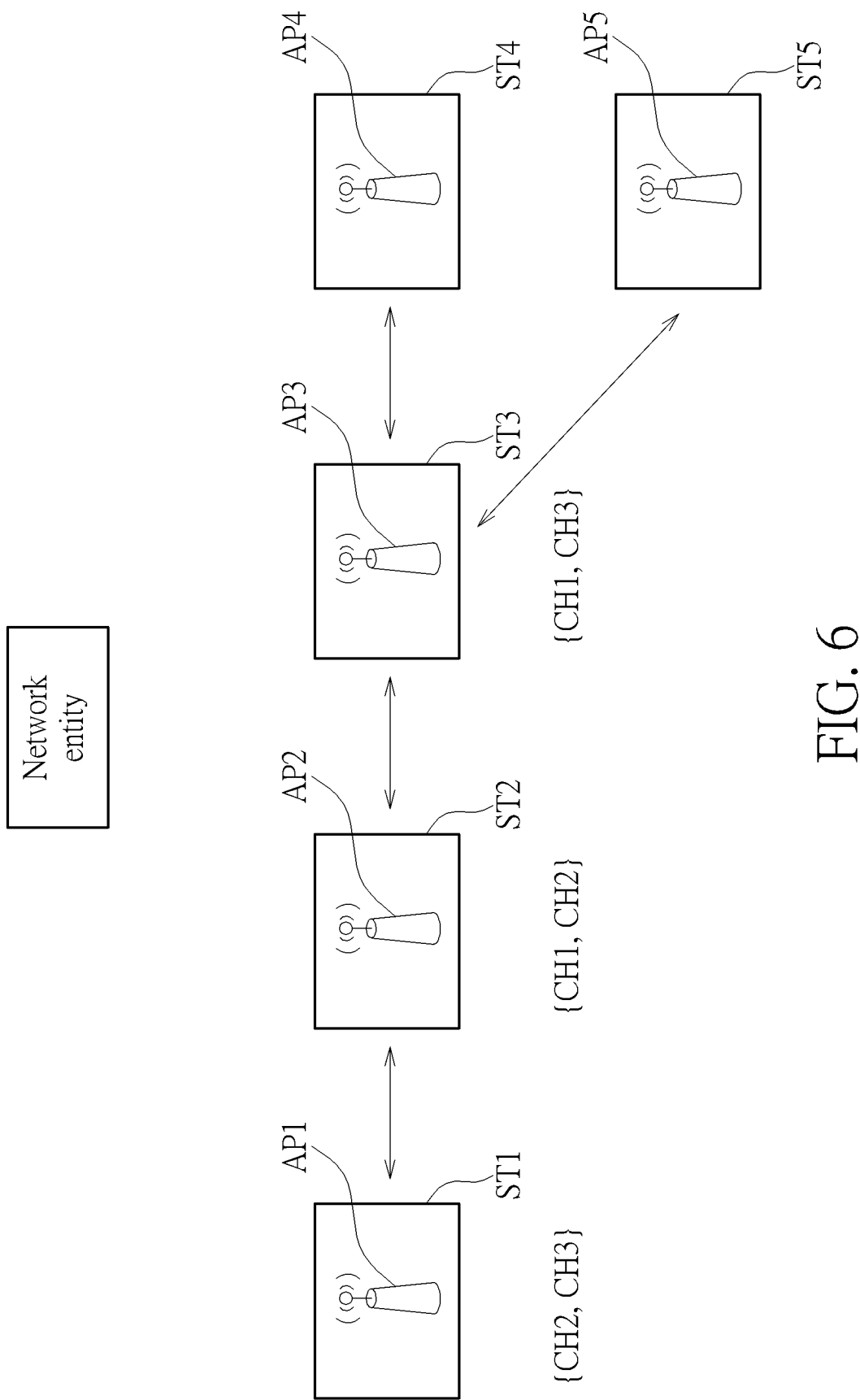
FIG. 6 is a schematic diagram of channel selection and allocation according to an example of the present invention.

FIG. 6 is a schematic diagram of channel selection and allocation according to an example of the present invention. As shown in FIG. 6, a rail transportation system includes a network entity (e.g., central server) and 5 APs AP1-AP5. The APs AP1-AP5 are deployed at 5 stations ST1-ST5, respectively. The network entity and the APs AP1-AP5 are used for representing a network and network nodes to simplify the illustration of the above examples. The network entity connects (not shown in FIG. 6) to the APs AP1-AP5, and handles resource (e.g., channel) allocations for the APs AP1-AP5. A double headed arrow between the APs represents respective interference between the APs. That is, the AP AP3 is interfered by 3 APs AP2, AP4 and AP5. The AP AP1 is interfered by one AP AP2.

The APs AP1-AP3 may request for changing channels (e.g., current allocated channels). The APs AP1-AP3 may update candidate channels of the APs AP1-AP3 periodically, respectively. The candidate channels are stored in a table by the network entity. The network entity obtains from the table that the candidate channels of the AP AP1 are channels CH2-CH3, the candidate channels of the AP AP2 are channels CH1-CH2, and the candidate channels of the AP AP3 are the channels CH1, CH3. In the present example, priorities of the APs AP1-AP3 from high to low are a third priority of the AP AP3, a second priority of the AP AP2, and a first priority of the AP AP1.

The network entity selects the channels CH1, CH3 from the candidate channels of the AP AP3, since the channels CH1, CH3 are available to the AP AP3. In one example, the channel CH3 has a better channel quality, or is affected by less interference. Thus, the network entity allocates the channel CH3 to the AP AP3.

The network entity starts to select available channel(s) of the AP AP2 from the candidate channels of the AP AP2, after selecting the channel CH3 allocated to the AP AP3. The network entity selects the channels CH1-CH2, since the channels CH1-CH2 are available to the AP AP2. In one example, the channel CH2 has a better channel quality, or is affected by less interference. Thus, the network entity allocates the channel CH2 to the AP AP2.

The network entity starts to select available channel(s) of the AP AP1 from the candidate channels of the AP AP1, after selecting the channels CH2-CH3 allocated to the APs AP2-AP3, respectively. Since the APs AP1 and AP3 are not interfered by each other, the APs AP1 and AP3 can use the same channel, i.e., the channel CH3. Since the channel CH2 is the allocated channel of the AP AP2 and is not available to the AP AP1, the network entity selects the channel CH3 as the available channel of the AP AP1. Then, the network entity allocates the channel CH3 to the AP AP1.

As can be seen, the network entity selects the allocated channels of the APs AP1-AP3 in a descending order of the priorities of the APs AP1-AP3. Thus, the APs AP1-AP3 can communicate with vehicle(s) (e.g., trains) (not shown in FIG. 6) with a better performance.

Figure 7:
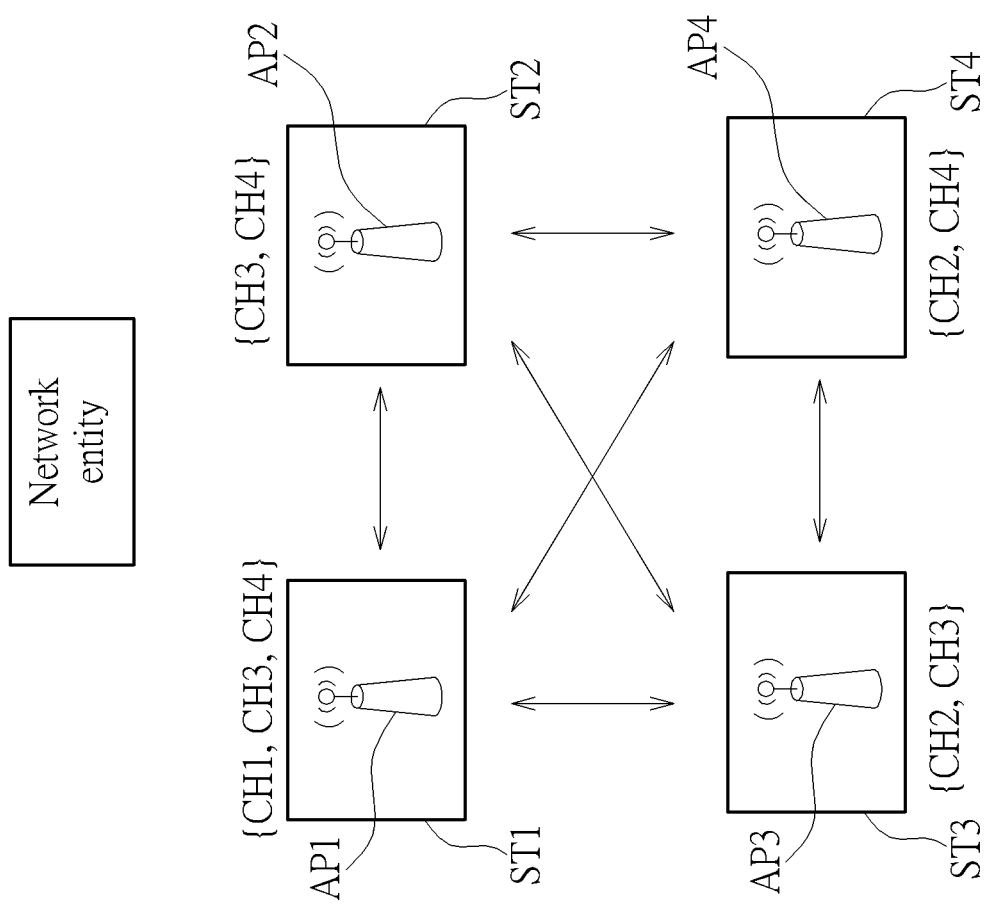
FIG. 7 is a schematic diagram of channel selection and allocation according to an example of the present invention.

FIG. 7 is a schematic diagram of channel selection and allocation according to an example of the present invention. As shown in FIG. 7, a rail transportation system includes a network entity (e.g., central server) and 4 APs AP1-AP4. The APs AP1-AP4 are deployed at 4 stations ST1-ST4, respectively. The network entity and the APs AP1-AP4 are used for representing a network and network nodes to simplify the illustration of the above examples. The network entity connects (not shown in FIG. 7) to the APs AP1-AP4, and handles resource (e.g., channel) allocations for the APs AP1-AP4. A double headed arrow between the APs represents respective interference between the APs. That is, the interference caused to the APs forms a 4-node complete graph.

The AP AP4 may request for changing a channel (e.g., a current allocated channel). In the present example, the network entity may also determine to change channels (e.g., current allocated channels) of the APs AP2-AP4 at the same time. The network entity obtains that candidate channels of the AP AP1 are channels CH1, CH3 and CH4, candidate channels of the AP AP2 are channels CH3-CH4, candidate channels of the AP AP3 are the channels CH2-CH3, and candidate channels of the AP AP4 are the channels CH2, CH4. In the present example, priorities of the APs AP1-AP4 from high to low are a fourth priority of the AP AP4, a third priority of the AP AP3, a second priority of the AP AP2, and a first priority of the AP AP1.

The network entity selects the channels CH2, CH4 from the candidate channels of the AP AP4, since the channels CH2, CH4 are available to the AP AP4. In one example, the channel CH4 has a better channel quality, or is affected by less interference. Thus, the network entity allocates the channel CH4 to the AP AP4.

The network entity starts to select available channel(s) of the AP AP3 from the candidate channels of the AP AP3, after selecting the channel CH4 allocated to the AP AP4. The network entity selects the channels CH2-CH3, since the channels CH2-CH3 are available to the AP AP3. In one example, the channel CH3 has a better channel quality, or is affected by less interference. Thus, the network entity allocates the channel CH3 to the AP AP3.

The network entity starts to select available channel(s) of the AP AP2 from the candidate channels of the AP AP2, after selecting the channel CH3 allocated to the AP AP3. Since the channels CH3-CH4 are the allocated channels of the APs AP3-AP4, none of the channels CH3-CH4 is available to the AP AP2. Thus, the network entity fails to select the available channel (s) of the AP AP2. The network entity reports that there is not any available channel to the AP AP2.

The network entity starts to select available channel(s) of the AP AP1 from the candidate channels of the AP AP1, after performing the channel allocation for the AP AP2. The network entity selects the channel CH1, since the channel CH1 is available to the AP AP1. Thus, the network entity allocates the channel CH1 to the AP AP1.

As can be seen, the network entity selects the allocated channels of the APs AP1, AP3 and AP4 in a descending order of the priorities of the APs AP1, AP3 and AP4. Thus, the APs AP1, AP3 and AP4 can communicate with vehicle (s) (e.g., trains) (not shown in FIG. 7) with a better performance. Meanwhile, the AP AP2 stops communicating with the vehicle(s).

Figure 8:
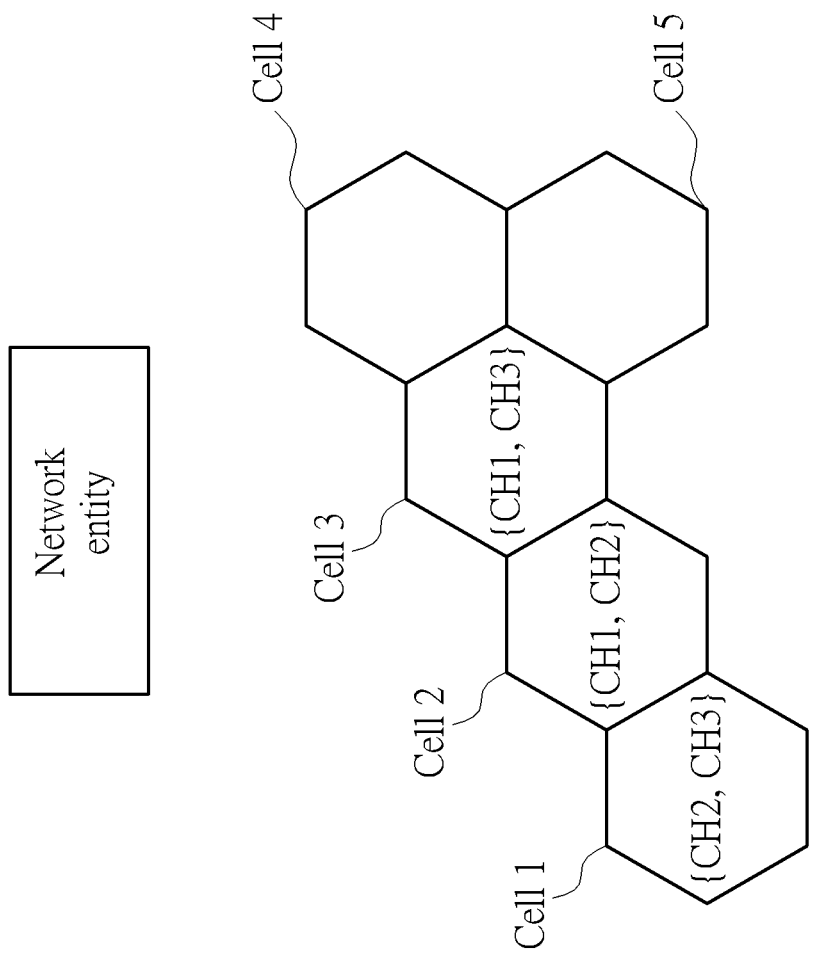
FIG. 8 is a schematic diagram of channel selection and allocation according to an example of the present invention.

FIG. 8 is a schematic diagram of channel selection and allocation according to an example of the present invention. As shown in FIG. 8, a wireless communication system includes a network entity (e.g., central server) and 5 cells cell1-cell5 with similar cell radii. The network entity and the cells cell1-cell5 are used for representing a network and network nodes to simplify the illustration of the above examples. The network entity connects (not shown in FIG. 8) to the cells cell1-cell5, and handles resource (e.g., channel) allocations for the cells cell1-cell5.

The cells cell1-cell3 may request for changing channels (e.g., current allocated channels). The network entity obtains from a table that the candidate channels of the cell cell1 are channels CH2-CH3, the candidate channels of the cell cell2 are channels CH1-CH2, and the candidate channels of the cell cell3 are the channels CH1, CH3. In the present example, priorities of the cells cell1-cell3 from high to low are a third priority of the cell cell3, a second priority of the cell cell2, and a first priority of the cell cell1. In addition, a reuse distance of the channel CH2 is nearly two times of the cell radius, and a reuse distance of the channel CH3 may be assumed equal to the cell radius.

The network entity selects the channels CH1, CH3 from the candidate channels of the cell cell3, since the channels CH1, CH3 are available to the cell cell3. In one example, the channel CH3 has a better channel quality, or is affected by less interference. Thus, the network entity allocates the channel CH3 to the cell cell3.

The network entity starts to select available channel(s) of the cell cell2 from the candidate channels of the cell cell2, after selecting the channel CH3 allocated to the cell cell3. The network entity selects the channels CH1-CH2, since the channels CH1-CH2 are available to the cell cell2. In one example, the channel CH2 has a better channel quality, or is affected by less interference. Thus, the network entity allocates the channel CH2 to the cell cell2.

The network entity starts to select available channel(s) of the cell cell1 from the candidate channels of the cell cell1, after selecting the channels CH2-CH3 allocated to the cells cell2-cell3, respectively. Since a distance between the cell cell1, cell3 is greater than the reuse distance of the channel CH3, the channel CH3 is available to the cell cell1. Accordingly, the network entity selects the channel CH3 and allocates the channel CH3 to the cell cell1.

As can be seen, the network entity selects the allocated channels of the cells cell1-cell3 in a descending order of the priorities of the cells cell1-cell3. Thus, the cells cell1-cell3 can communicate with vehicle (s) (e.g., trains) (not shown in FIG. 8) with a better performance.

It should be noted that although the above examples are illustrated to clarify the related operations of corresponding processes. The examples can be combined and/or modified arbitrarily according to system requirements and/or design considerations.

Those skilled in the art should readily make combinations, modifications and/or alterations on the abovementioned steps, description and examples. Some steps described above may not necessarily have to be used in the invention. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the processes above may be compiled into the program codes 214.

Examples of the hardware may include analog circuit(s), digital circuit (s) and/or mixed circuit (s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides a method and related network for efficiently handling channel allocation for multiple network nodes. Allocated channel(s) of the network node with a lower priority is selected according to the allocated channel(s) of the network node with higher priorit(ies). Thus, the problem of channel selection and allocation/reallocation for multiple network nodes is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for a network to handle channel allocation for multiple network nodes, comprising:
   obtaining at least one first channel of a first network node and at least one second channel of a second network node;
   determining that a first priority of the first network node is lower than a second priority of the second network node according to at least one policy;
   selecting at least one first available channel from the at least one first channel according to at least one second allocated channel of the second network node, after selecting the at least one second allocated channel;
   selecting at least one first allocated channel from the at least one first available channel, if the network selects the at least one first available channel from the at least one first channel successfully; and
   allocating the at least one first allocated channel to the first network node.

2. The method of claim 1, wherein the step of determining that the first priority is lower than the second priority according to the policy comprises:
   determining that the first priority is lower than the second priority, if first interference caused to the first network node is smaller than second interference caused to the second network node.

3. The method of claim 1, wherein the step of determining that the first priority is lower than the second priority according to the policy comprises:
   determining that the first priority is lower than the second priority, if a first transmission amount of the first network node is smaller than a second transmission amount of the second network node.

4. The method of claim 1, wherein the step of determining that the first priority is lower than the second priority according to the policy comprises:
   determining that the first priority is lower than the second priority, if a first number of the at least one first channel is greater than a second number of the at least one second channel.

5. The method of claim 1, further comprising:
   clearing at least one allocated channel of the first network node, before obtaining the at least one first channel.

6. The method of claim 1, wherein the step of selecting the at least one first available channel from the at least one first channel according to the at least one second allocated channel comprises:
   selecting the at least one first channel which is not the at least one second allocated channel, if the first network node is interfered by the second network node.

7. The method of claim 1, wherein the step of selecting the at least one first available channel from the at least one first channel according to the at least one second allocated channel comprises:
   selecting all of the at least one first channel, if the all of the at least one first channel are not the at least one second allocated channel.

8. The method of claim 1, wherein the step of selecting the at least one first available channel from the at least one first channel according to the at least one second allocated channel comprises:

selecting all of the at least one first channel, if the first network node and the second network node are not interfered by each other.

9. The method of claim 1, further comprising:

reporting to the first network node that there is not any available channel via a configuration, if the network fails to select the at least one first available channel from the at least one first channel.

10. The method of claim 1, wherein at least one priority of the at least one first allocated channel is higher than at least one priority of the rest of the at least one first available channel.

11. At least one processor configured to handle channel allocation for multiple network nodes, comprising:

a first module for causing the at least one processor to obtain at least one first channel of a first network node and at least one second channel of a second network node;

a second module for causing the at least one processor to determine that a first priority of the first network node is lower than a second priority of the second network node according to at least one policy;

a third module for causing the at least one processor to select at least one first available channel from the at least one first channel according to at least one second allocated channel of the second network node, after selecting the at least one second allocated channel;

a fourth module for causing the at least one processor to select at least one first allocated channel from the at least one first available channel, if the at least one first available channel is selected from the at least one first channel successfully; and a fifth module for causing the at least one processor to allocate the at least one first allocated channel to the first network node.

12. The at least one processor of claim 11, wherein determining that the first priority is lower than the second priority according to the policy comprises:

determining that the first priority is lower than the second priority, if first interference caused to the first network node is smaller than second interference caused to the second network node.

13. The at least one processor of claim 11, wherein determining that the first priority is lower than the second priority according to the policy comprises:

determining that the first priority is lower than the second priority, if a first transmission amount of the first network node is smaller than a second transmission amount of the second network node.

14. The at least one processor of claim 11, wherein determining that the first priority is lower than the second priority according to the policy comprises:

determining that the first priority is lower than the second priority, if a first number of the at least one first channel is greater than a second number of the at least one second channel.

15. The at least one processor of claim 11, further comprising:

a sixth module for causing the at least one processor to clear at least one allocated channel of the first network node, before obtaining the at least one first channel.

16. The at least one processor of claim 11, wherein selecting the at least one first available channel from the at least one first channel according to the at least one second allocated channel comprises:

selecting the at least one first channel which is not the at least one second allocated channel, if the first network node is interfered by the second network node.

17. The at least one processor of claim 11, wherein selecting the at least one first available channel from the at least one first channel according to the at least one second allocated channel comprises:

selecting all of the at least one first channel, if the all of the at least one first channel are not the at least one second allocated channel.

18. The at least one processor of claim 11, wherein selecting the at least one first available channel from the at least one first channel according to the at least one second allocated channel comprises:

selecting all of the at least one first channel, if the first network node and the second network node are not interfered by each other.

19. The at least one processor of claim 11, further comprising:

a sixth module for causing the at least one processor to report to the first network node that there is not any available channel via a configuration, if the at least one first available channel is selected from the at least one first channel unsuccessfully.

20. The at least one processor of claim 11, wherein at least one priority of the at least one first allocated channel is higher than at least one priority of the rest of the at least one first available channel.

* * * * *